(12) United States Patent
Koelewyn et al.

(10) Patent No.: US 6,966,516 B2
(45) Date of Patent: Nov. 22, 2005

(54) SPINNING REEL WITH REAR ADJUSTABLE DRAG, ADJUSTABLE HANDLE LENGTH AND UNIVERSAL PIVOT HANDLE GRIP

(75) Inventors: Robert W. Koelewyn, Fairfield, CT (US); Donald C. Liu, Trumbull, CT (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 0 days.

(21) Appl. No.: 10/868,999

(22) Filed: Jun. 16, 2004

(65) Prior Publication Data

US 2004/0232264 A1      Nov. 25, 2004

Related U.S. Application Data

(62) Division of application No. 09/908,190, filed on Jul. 18, 2001, now Pat. No. 6,769,639.

(60) Provisional application No. 60/219,089, filed on Jul. 18, 2000.

(51) Int. Cl.$^7$ .............................................. A01K 89/01
(52) U.S. Cl. ...................................... 242/284; 74/545
(58) Field of Search ................................ 242/246, 282, 242/283, 284; 16/405, 429; 74/545, 546, 74/547; 75/545

(56) References Cited

U.S. PATENT DOCUMENTS

| 250,165 | A | * | 11/1881 | Palmer | 74/546 |
|---|---|---|---|---|---|
| 470,178 | A | * | 3/1892 | Byllesby | 74/546 |
| 3,606,193 | A | * | 9/1971 | Allred | 242/284 |
| 3,990,323 | A | * | 11/1976 | Kamikawa | 242/284 |
| 4,310,127 | A | * | 1/1982 | Yamasaki | 242/284 |
| 4,524,921 | A | * | 6/1985 | Ozaki et al. | 242/284 |
| 4,702,431 | A |  | 10/1987 | Kaneko | 242/84.5 |
| 4,938,433 | A |  | 7/1990 | Toda | 242/245 |
| 5,040,743 | A |  | 8/1991 | Zurcher et al. | 242/246 |
| 5,195,698 | A |  | 3/1993 | Kyoichi | 242/245 |
| 5,277,379 | A |  | 1/1994 | Kaneko | 242/245 |
| 5,289,991 | A |  | 3/1994 | Sugawara | 242/245 |
| 5,308,020 | A | * | 5/1994 | Kawabe | 242/284 |
| 5,660,344 | A |  | 8/1997 | Testa | 242/283 |
| 5,988,547 | A |  | 11/1999 | Koelewyn | 242/246 |
| 6,158,089 | A | * | 12/2000 | Monahan et al. | 16/429 |
| 6,286,772 | B1 |  | 9/2001 | Koelewyn | 242/246 |
| 6,648,257 | B2 | * | 11/2003 | Lu | 242/284 |
| 6,769,639 | B2 |  | 8/2004 | Koelewyn et al. | 242/246 |

* cited by examiner

*Primary Examiner*—Kathy Matecki
*Assistant Examiner*—Evan Langdon
(74) *Attorney, Agent, or Firm*—Fellers, Snider, Blankenship, Bailey & Tippens, P.C.

(57) ABSTRACT

A spinning reel has a drag assembly in its spool on one end of the reel body, and an adjustment knob for the drag assembly on another end of the reel body, where it is conveniently accessed during use of the reel. The reel has a handle arm with two slidably disposed handle arm portions, which are releasably secured together at selected positions to provide a variable length handle arm.

2 Claims, 6 Drawing Sheets

SPINNING REEL WITH REAR ADJUSTABLE DRAG, ADJUSTABLE HANDLE LENGTH AND UNIVERSAL PIVOT HANDLE GRIP

FIELD OF THE INVENTION

The invention here in relates to a spinning reel having a drag mechanism adjustable from the rear of the reel body, a handle arm of adjustable length, with the handle further providing a rotatable and pivotal grip.

BACKGROUND OF THE INVENTION

Deep sea fishing for large game fish, such as swordfish and tuna, is a demanding and rigorous sport that requires excellent fishing tackle. Some fishermen prefer to use spinning reels for deep sea fishing; however, present deep sea spinning reels have several drawbacks.

The drag, or amount of frictional force the reel itself applies to the fishing line, must be set accurately and quickly. Spinning reels traditionally have drag adjustments positioned on the front of the spool, and it is highly difficult to reach around the reel and make an adjustment while fighting a fish. Yet, it is desirable to be able quickly set an initial drag for use following the initial strike, and then be able to adjust the drag during the ensuing fight with the fish.

The very large game fish are also quite strong, and require substantial leverage on the handle of the reel to rotate the reel in landing the fish. At other times, the fish may be moving such that rapid rotation of the reel is necessary to avoid slack in the line. The length of the handle is thereby typically a compromise selected to provide sufficient length for good leverage but being sufficiently short to achieve good winding speed.

The handle has a knob or grip extending therefrom, and the fisherman grasps the knob or grip to operate the handle. The knob or grip generally rotates, but is limited to one degree of freedom to which the fisherman must adjust. In fighting a fish over a period of one hour or more, the ergonomics of the handle become an important factor in the fisherman's ability to perform at utmost efficiency.

Accordingly, improvements in deep sea spinning reels would be desirable and would increase the enjoyment and success of the fisherman.

SUMMARY OF THE INVENTION

It is a principal object of the invention herein to provide an improved fishing reel, and more particularly to provide a spinning reel adapted for deep sea fishing.

It is an another object of the invention herein to provide a spinning reel having an easily adjusted drag mechanism.

It is a further object of the invention to provide a spinning reel having a drag adjustment mechanism which can be set at the rear of the reel.

It is an additional object of the invention herein to provide a fishing reel adapted for both high leverage and high speed retrieval of fishing line.

It a further object of the invention herein to provide a fishing reel having a handle arm of adjustable length.

It is another object of the invention herein to provide a fishing reel having a handle arm of adjustable length wherein the adjustment may be made quickly and easily during use of the reel.

It is a still further object of the invention to provide a spinning reel having a comfortable and efficient handle grip.

In carrying out the foregoing objects of the invention, a fishing reel of the spinning type is provided with a reel body and a foot for mounting the reel body to a rod. The reel body has a cup shaped flyer at the front thereof, and a spool assembly including a spool is mounted on a longitudinal main shaft extending from the reel body. A handle shaft and handle assembly extends from the reel body and the reel body contains a drive mechanism operated by the handle shaft to rotate the flyer and reciprocate the spool assembly with respect to the flyer. A drag assembly is at least partially contained within the spool assembly and includes friction clutch means coupling the spool and the main shaft to provide an adjustable friction drag upon compression of the clutch means, and a pulling shaft connected to compress the frictional clutch means and extending through the tubular main shaft into the reel body. A drag nut is threadably received on the pulling shaft to compress the clutch upon rotation thereof, and a drag adjustment handle is rotatably mounted on the reel body and connected for rotating the drag nut.

According to additional aspects of the invention, the drag handle is positioned on the rear of the reel body, opposite the spool, and operates a shaft engaged with the drag nut. The shaft is axially and slidably received in the drag nut, so that the drag nut, pulling shaft and main shaft may reciprocate with the spool assembly.

According to other aspects of the invention, the drag assembly also includes drag calibration means, which is operable to calibrate the drag adjustment settings provided by the drag handle.

According to further aspects of the invention, the drag handle releasably engages an adjustable positioned strike stop, so that the drag may be quickly and accurately set at a pre-adjusted strike level. The strike stop is adjustably positioned on the reel body with respect to a free spool position of the drag handle.

According to still further aspects of the invention, the drag handle engages the reel body in incremental detents, each detent corresponding to an increment of drag force.

According to other aspects of the invention, the reel has a rotatable handle shaft extending from the reel body and a handle arm and mounting a handle grip for rotating the handle shaft, wherein the length of the handle arm is adjustable. In accordance with more particular aspects of the invention, the handle arm has a fixed receptor arm slidably receiving an extensible arm, and the extensible arm has notches releasably engaged by a keeper. The keeper is operable by a spring loaded depressible button positioned on the fixed arm, adjacent the handle grip.

According to yet additional aspects of the invention, the handle grip is rotationally and pivotally mounted to the handle arm, providing a range of motion in grasping an applying force to the handle arm. The pivotal motion is selectively disengageable.

The foregoing and other more specific objects and features of the invention will in part be readily understood by those skilled in the art and will in part appear in the following description of the preferred embodiments and the claims, taken together with the drawings.

BRIEF DESCRIPTION OF THE DRAWINGS

The same reference numerals refer to the same elements throughout the various figures.

DESCRIPTION OF THE PREFERRED EMBODIMENT

A spinning reel 10 according to the invention herein is illustrated in the various Figures. It generally comprises a reel body 12 having a foot 14 extending therefrom on a strut 16, the foot 14 being adapted for mounting the reel 10 to a fishing rod. The reel body 12 has a rotating flyer 18 mounted on the front thereof, and a spool assembly 20 mounted on a tubular main spool shaft 22 extending from the reel body.

The spool assembly partially contains a drag assembly generally indicated at 24. A drag adjustment mechanism 26 has its handle 28 positioned at the rear of the reel body 12.

The spinning reel 10 further generally comprises a handle 30 including a handle arm 100 and a handle grip 114.

It will be understood that the reel body 12 contains a drive mechanism for rotating the flyer 18 and for reciprocating the spool assembly 20 in and out of the flyer, whereby the flyer retrieves and winds fishing line smoothly onto the hub of the spool. The flyer 18 has at least one line roller 19 to direct line onto the spool. The drive mechanism structure is seen primarily in FIGS. 1, 4 and 5, and generally comprises a bevel gear 11 driving a pinion gear 13 connected-with the flyer. A traveler 15 is driven by an eccentric pin 17 on bevel gear 11 to reciprocate the main spool shaft 26 and spool assembly 20.

The general operation of the spinning reel further embraces the function of the drag assembly 24 and drag adjustment mechanism 26 in permitting rotation of the spool 21 of the spool assembly 20 relative to the main spool shaft 22, for releasing fishing line when the force on the line exceeds a predetermined level set by the drag adjustment mechanism 26.

Figure 1:
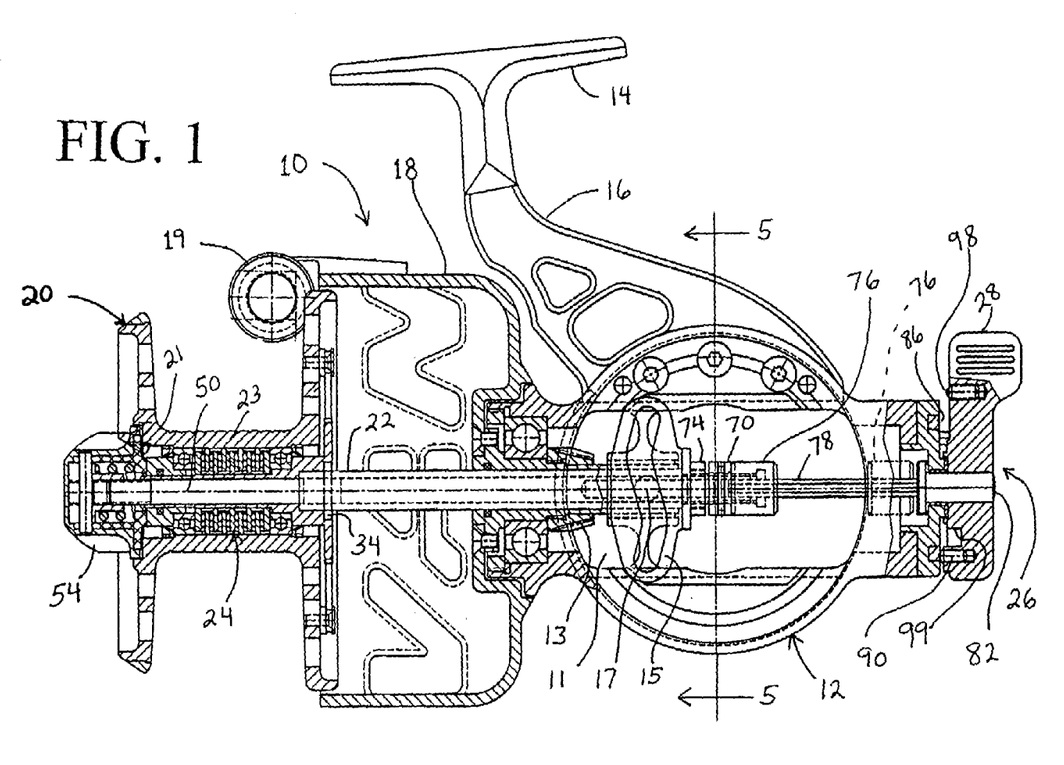
FIG. 1 is a side view, partially in section, of a spinning reel according to the invention herein.
Figure 3:
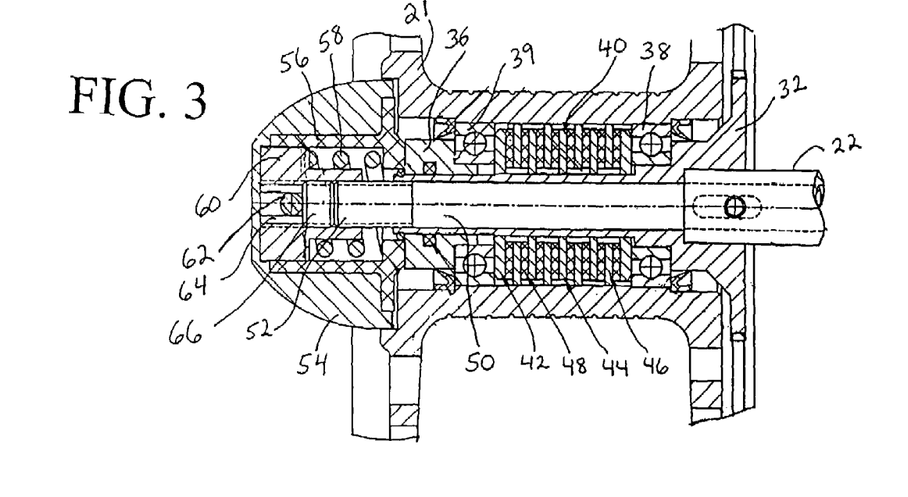
FIG. 3 is an enlarged sectional view of the spool assembly of the spinning reel of FIG. 1.

With reference to FIGS. 1 and 3, the spool assembly includes a spool hub 32 fitted on the end of the main spool shaft 22 and pinned against rotation with respect to the main spool shaft by pin 34 (FIG. 1). The spool hub 32 extends forwardly from the main spool shaft 22, inside the hub 23 of the spool 21. A retainer 36 is fitted over the spool hub 32 near its distal end. The spool 21 is supported on the spool hub 32 by a first set of ball bearings 38 and a second set of ball bearings 39. A clutch pack 40 of washers is positioned between the ball bearing assemblies 38 and 39, including base drag washers 42 at the ends, slotted drag washers 44 that are keyed to the spool hub 32, octagonal drag washers 46 that are keyed to the spool 21, and drag washers 48 interposed between the slotted washers 44 and the octagonal washers 46. Thus it will be appreciated upon compression of the clutch pack 40 of washers between the bearing assemblies, friction between the washers increases to create a friction drag force against rotation of the spool 21 relative to the spool hub 32. A similar drag assembly is shown in U.S. Pat. No. 5,988,547 incorporated herein by reference.

A drag adjustment pull shaft 50 extends through the tubular main spool shaft 22 and the spool hub 32, and terminates in a distal threaded end 52.

A drag calibration knob 54 is generally mounted on the drag adjustment pull shaft 50 on the forward end of spool 21. The calibration knob 54 has an inner sleeve 56 which bears against the retainer 36 and captures a compression spring 58 between it and a spring guide 60, which is threaded on the threaded end 52 of the drag adjustment pull shaft 50. A pin 62 extends through a slot 64 in the spring guide and the pin is engaged with the calibration knob 54 for turning the spring guide to adjust the compression of the spring 58 in calibrating the drag, with the slot 64 permitting the pull shaft to pull the spring guide toward the clutch pack to compress the spring independent of calibration knob 54, and thereby compress the clutch pack in order to adjust the operating range of the drag. A set screw 66 is provided adjacent the end of the pull shaft 52, and the set screw 66 operates to lock the pull shaft 52 and spring guide 60 in a calibrated position.

Figure 2:
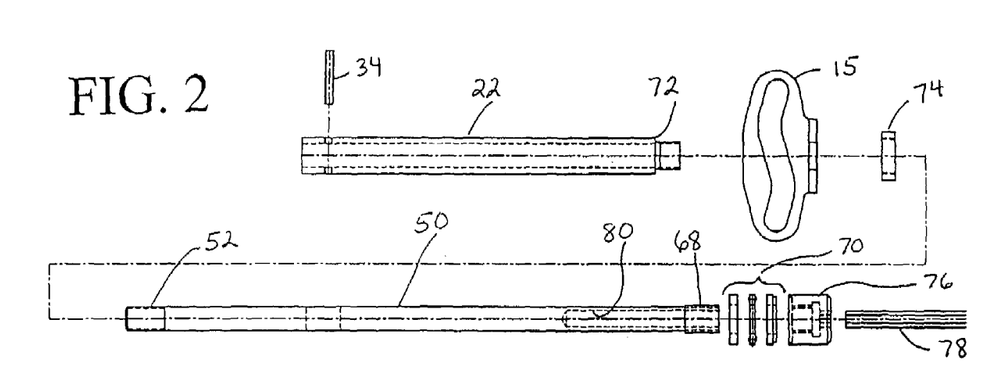
FIG. 2 is an exploded side elevation view of the main shaft and drag adjustment shaft elements of the spinning reel of FIG. 1.

As noted above, the drag is adjusted by pulling on the drag pull shaft 52 to compress the clutch pack 40, and this is accomplished by the drag adjustment assembly 26 position generally through and at the rear end of the reel body 12. With reference to FIGS. 1-3, the pull shaft 50 extends through the tubular main spool shaft 22, and the pull shaft is also threaded at its end 68. A thrust washer 70 is seated on a shoulder 72 of the main spool shaft 22. A drag nut 76 is threaded on to threaded end 68 of the drag adjustment pull shaft 50, and it will be appreciated that turning the drag nut 76 causes axial movement of the pull shaft 50 to tighten or loosen the compression of the clutch pack 40 and thereby adjusts the drag on the spool 21.

The drag nut 76 is turned by a spline shaft 78 which extends through a mating opening in the drag nut 76 and further extends into a tubular recess 80 in the drag adjustment pull shaft 50. This permits the drag nut and pull shaft to reciprocate on the spline shaft 78, so that the spool assembly may reciprocate 20 in and out of the flyer 18. This is illustrated in FIG. 1, wherein the drag nut 76 is shown in solid in a first position with the spool assembly 21 extending from the flyer 18, and is shown in dotted in a second position in which the spool assembly 21 would be retracted in the flyer 18. As also seen in FIG. 2, the traveler 15 is secured to the main spool shaft 22 by nut 74, for reciprocating the spool shaft and spool assembly.

Figure 4:
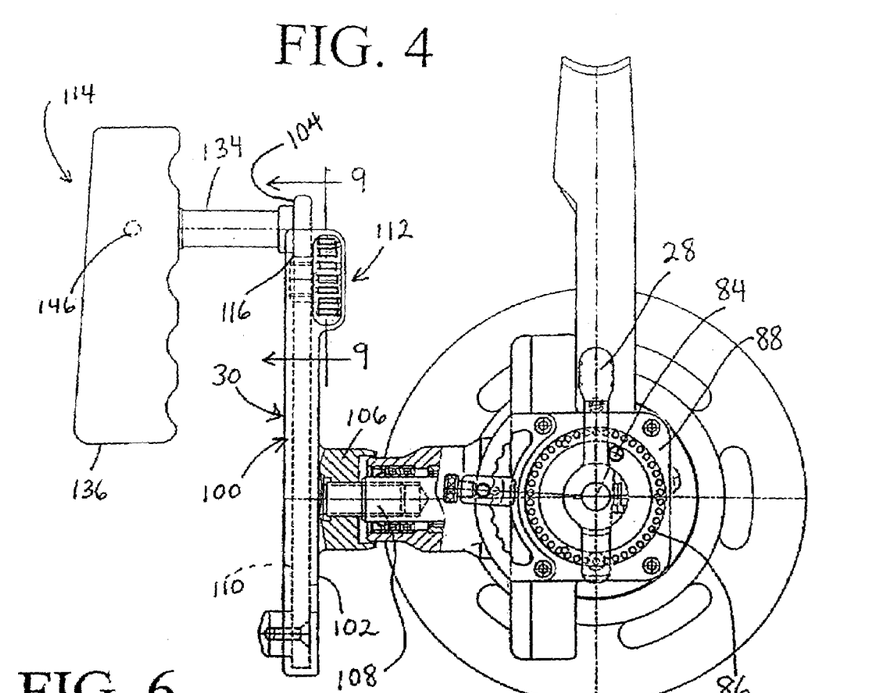
FIG. 4 is a rear end view, partially in section, of the spinning reel of FIG. 1 with the drag handle set in the free spool position.

The spline shaft 78 is fitted with an end bushing 82 on which handle 28 is mounted for rotating the spline shaft. With reference to FIG. 4, the handle 78 is shown against a stop pin 84, and this preferably corresponds to a free spool position wherein the drag assembly provides zero drag or free wheeling of the spool 21. The calibration knob 54 is adjusted to achieve the zero drag condition when the handle 28 is in the free spool position of FIG. 4.

Rotating the handle 28 counter clockwise turns the drag adjustment nut 76 to compress the clutch pack 40 via pull shaft 50, thereby providing a drag force which increases with the amount of counter clockwise rotation of the handle 28. A plurality of detent openings 86 are provided in a plate 88 adjacent the drag handle 28, and the drag handle 28 is provided with a first spring loaded detent ball assembly 90 which sequentially engages the detent openings 86. In the preferred embodiment, the distance between each of the detent openings 86 provides an increase or decrease of one pound of drag force, whereby the fisherman can adjust the drag in one pound increments by tactile feedback from the handle 28. The detent ball assembly 90 includes a ball for engagement with the detents, and a spring biasing the ball toward the detents. The spring also permits the ball to retract within the handle for movement between detents.

Drag adjustment assembly 26 also provides for rapid setting of a strike zone drag. The strike zone drag is a drag force that is preselected by the angler for engagement upon encountering a fish strike. It will be appreciated that this is a moment of high activity, during which the fisherman may not have time to carefully adjust the drag to a desired setting, but during which a properly adjusted drag is very important.

Rapid adjustment of strike zone drag is achieved by providing a stop 92 adjustably positioned with respect to the handle 28 and releasably engaged by the handle 28. To this end, and arcuate notched sector plate 94 extends adjacent the path of rotation of handle 28, and stop 92 is adjustably positioned along the sector plate 94. The stop 92 is cylindrical and slotted to accommodate the sector plate 94, and includes a thumb screw 96 for setting the position of the stop along the sector plate. The handle 28 has a second detent ball assembly 98, also including a ball spring biased to extend from the handle, which engages the stop 92 when the handle 28 is positioned adjacent thereto. However, the handle 28 may override the stop 92 upon application of additional force, causing the detent ball to retract as the handle passes over the stop 92.

Figure 6:
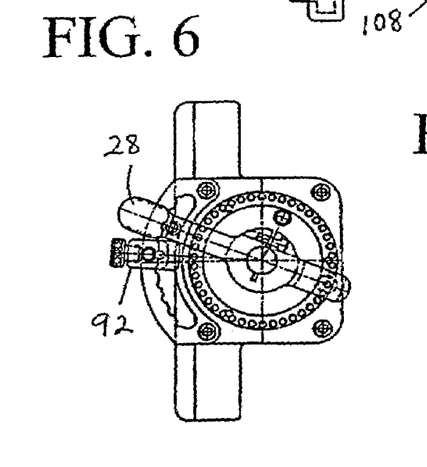
FIG. 6 is a rear view of the drag adjustment mechanism of the spinning reel of FIG. 1, showing the drag handle set adjacent the strike zone position.
Figure 7:
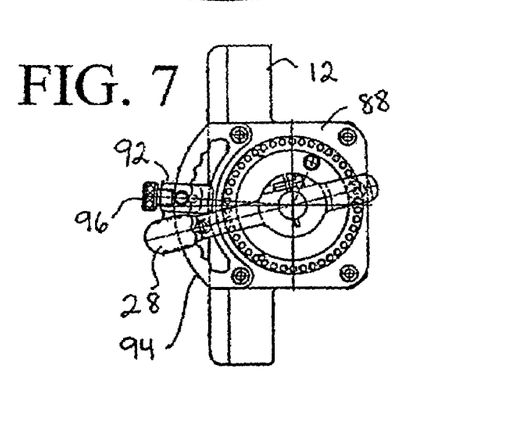
FIG. 7 is a rear view of the drag adjustment assembly of the spinning reel of FIG. 1 with the drag handle at an adjusted position past the strike zone.

Thus, with reference to FIGS. 4, 6 and 7, the drag may be set at a zero or other low force when the handle 28 is against the post 84. The strike zone stop 92 may be positioned along the sector plate 94, at a preselected amount of drag force. With reference to FIG. 6, upon encountering a fish strike, the fisherman may pivot the handle, 28 toward the stop 92 and upon reaching stop 92, the handle 38 will be releasably engaged. FIG. 6 shows the handle 28 just short of engaging with the stop 92, so that the stop 92 can be seen. This releasable engagement of handle 28 and stop 92 provides the fisherman with a quick and accurate way of setting a preselected strike zone drag. With reference to FIG. 7, as the fighting of the fish continues, the fisherman may override the stop 92 and move the handle 28 to set a higher, or lower, selected drag force, with each of the detent openings 86 providing an increment of selected drag. The handle 28 may be rotated counter clockwise to increase drag until it again encounters the stop post 84, and the handle is slotted at 99 so that nearly 360° of rotation is available before the handle 28 again encounters the stop post 84.

The drag adjustment is accomplished from the rear of the reel body 12, with the spline shaft turning the drag nut 76 to operate the main pull shaft 50 and compress the clutch pack 40 in the spool assembly. This achieves both an accurate and convenient drag adjustment.

It will also be appreciated that in fighting large game fish, it is desirable to change the leverage provided by the handle 30 of the spinning reel 10 and that any changes must be accomplished quickly while the fighting of the fish is in progress.

Figure 5:
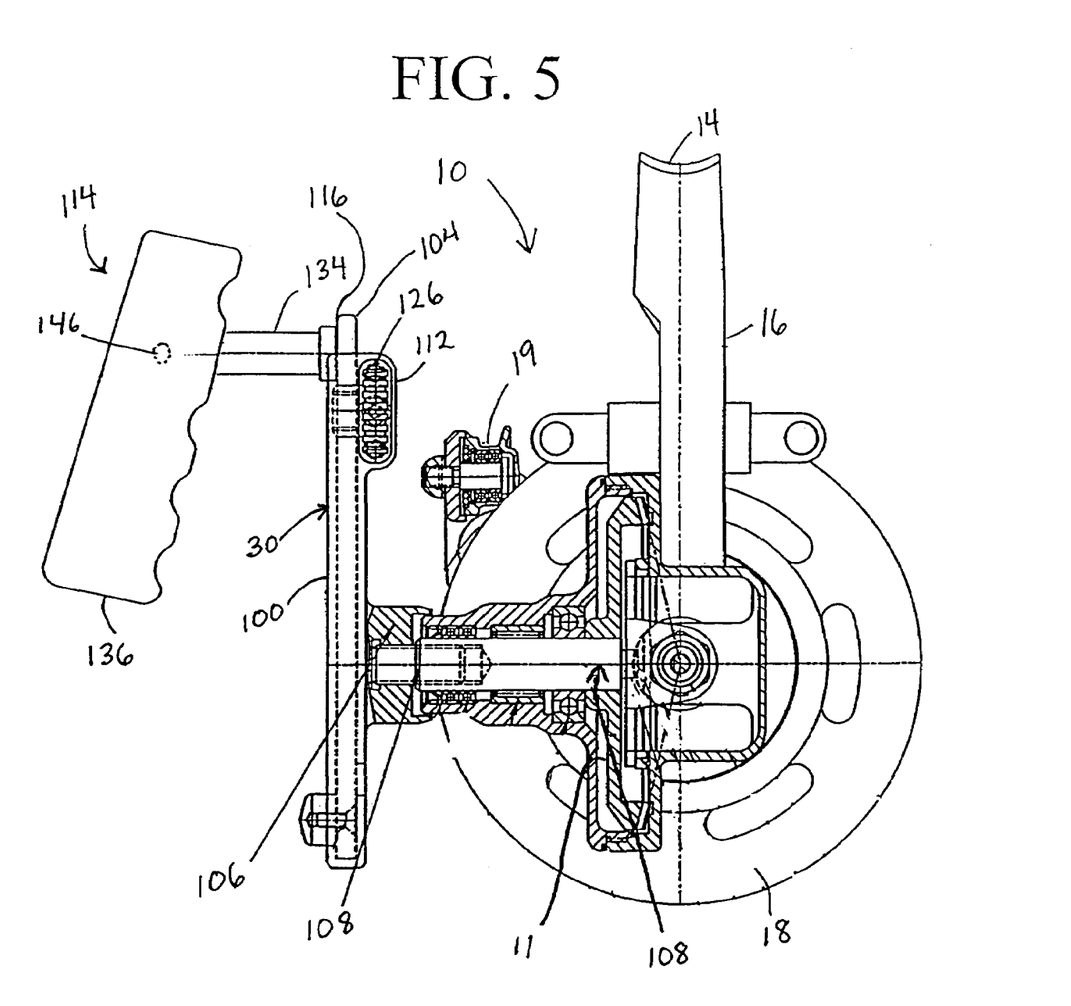
FIG. 5 is a sectional view of the spinning reel of FIG. 1, taken along the lines 5—5 of FIG. 1.

The handle 30 provided on the spinning reel 10 achieves rapid adjustment of its length to provide varying leverage. Thus, the handle 30 has a handle arm 100 including a fixed base arm 102 and an extensible handle grip arm 104. With reference to FIGS. 4 and 5, the fixed arm 102 has a bushing 106 thereon which is mounted to a handle shaft 108 for operating the drive mechanism of the reel 10, shown in FIG. 5. The fixed arm 102 is thereby "fixed" with respect to the handle shaft 108.

The fixed arm 102 has a C-shaped cross section to define slot 110 slidably receiving the extensible arm 104, and a releasable stop mechanism 112 for securing the extensible arm at selected positions. The extensible arm 104 mounts the handle grip or knob assembly 114 at an opening 116, with position of the handle grip assembly on handle arm 100 best seen in FIGS. 4 and 5.

Figures 8, 9, 10:
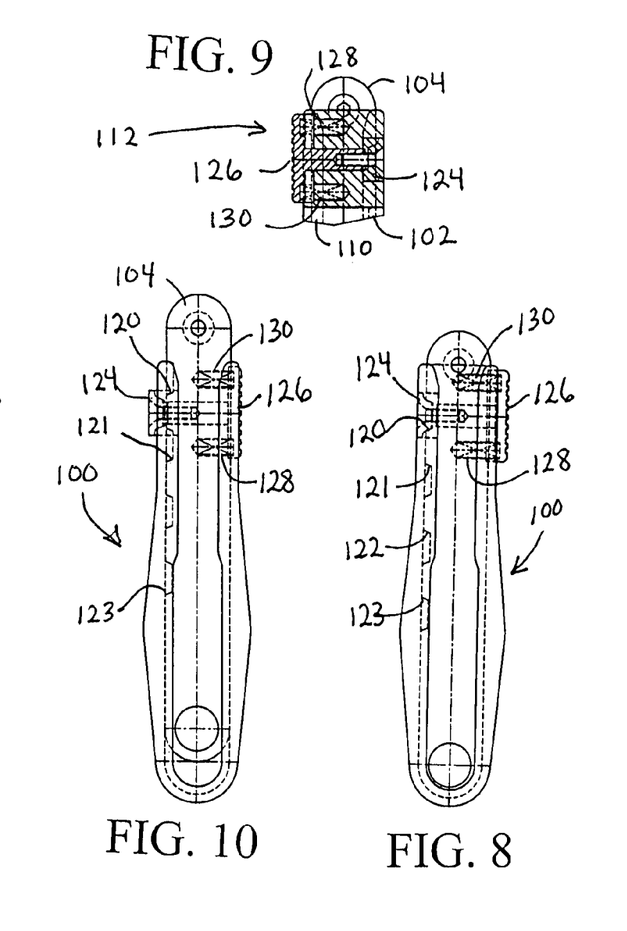
FIG. 8 is a side view of the handle arm of the spinning reel of FIG. 1, in its innermost adjusted position.
FIG. 9 is a sectional view of the handle arm of the spinning reel of FIG. 1, taken along the lines 9—9 of FIG. 4.
FIG. 10 is a side view of the handle arm of the spinning of FIG. 1, with the handle arm between adjusted length positions.

The extensible arm 104 has a series of notches 120, 121, 122 and 123 along one edge thereof. The stop mechanism 112 includes a keeper 124 which fits into the notches 120-123, and holds the extensible arm 104 in position with respect to the fixed arm 102. With respect to FIG. 8, in which the arms 102, 104 are shown in isolation, the keeper 124 is positioned in notch 120, providing the handle arm 100 with its shortest length. As best seen in FIG. 9, the stop mechanism 112 includes a depressible button 126 connected with the keeper 124 and spring biased from the fixed arm by springs 128 and 130 to maintain the keeper in a notch.

Figure 11:
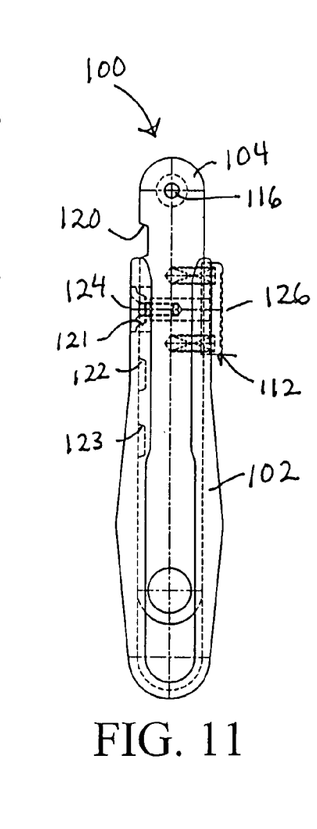
FIG. 11 is a side view of the handle arm of the spinning reel of FIG. 1, shown in a first extended adjusted length position.
Figure 12:
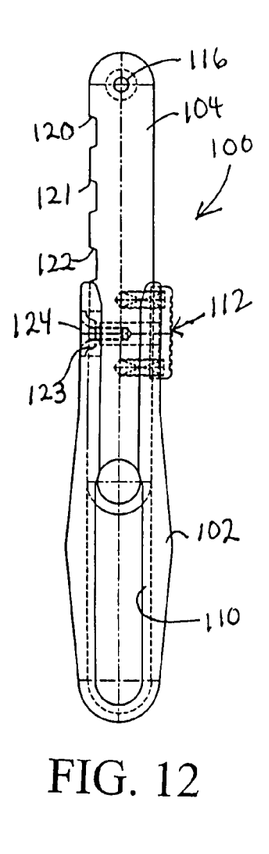
FIG. 12 is a side view of the handle arm of the spinning reel of FIG. 1, shown in a maximum extended adjusted length position.

With respect to FIG. 10, the button 126 is depressed against the springs 128 and 130, lifting the keeper 124 out of notch 120 and permitting the extensible arm 104 to slide outwardly from the fixed arm 102. With reference to FIG. 11, the keeper 124 is settled in notch 121, securing the extensible arm 104 in its first outwardly adjusted position. The button 126 may be depressed to remove the keeper from notch 121, and the extensible arm may be moved to any one of the four notches 120–123 to provide the desired adjustable length of the handle arm 30, including the longest adjustable position of FIG. 12.

It will be appreciated that the button 126 may be depressed while gripping the handle grip assembly 114 and the handle grip assembly may then be used to adjust the position of the extensible arm 104. Thus, adjustment of the handle arm length is a one hand operation quickly and easily achieved while operating the reel 10 in the midst of fighting a fish. The longest adjustable length provides the most leverage, and the shortest adjustable length provides the most speed in operation of the reel 10.

The handle grip assembly 114 is also adapted for maximum ergonomic comfort to the fisherman. Referring now to FIGS. 4, 5, 13 and 14, it will be appreciated that the handle grip assembly includes a shank 134 mounted to the extensible arm 104 at opening 116 and a handle grip 136 mounted on the shank 134. The handle shank includes an axle 138 and outer sleeve 140, and the outer sleeve terminates in a ball 142 received in a recess 144 in the handle grip. The handle grip is pinned to the ball by pin 146, and the handle may rotate relative to the arm 104 by virtue of the axle and sleeve arrangement of the shank 134.

Figure 13:
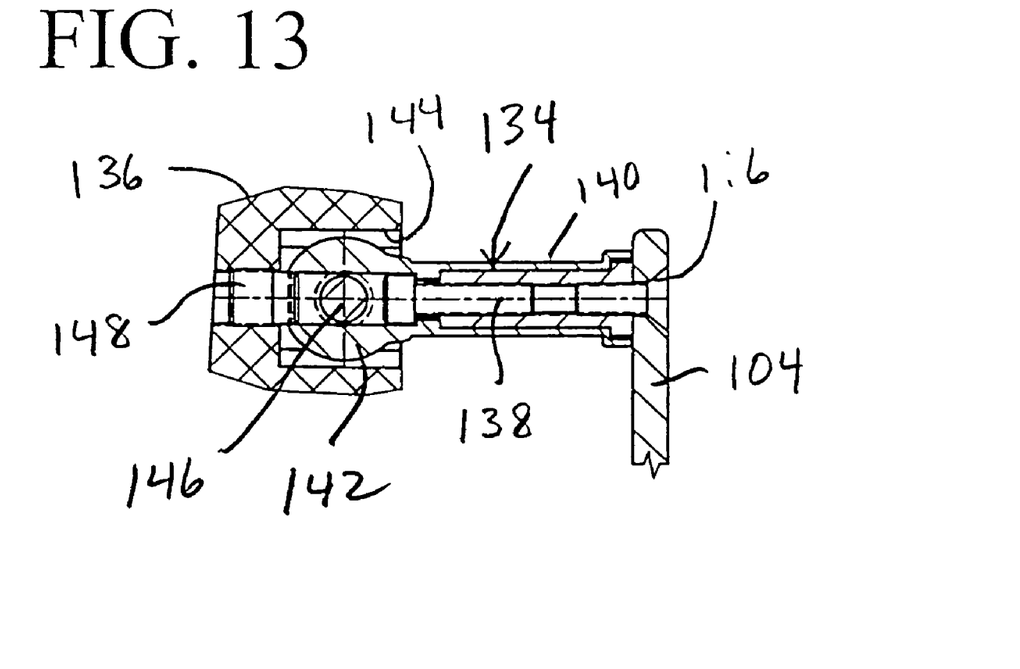
FIG. 13 is a view of the handle grip of the spinning reel of FIG. 1, with the handle grip locked in a rotational mode.
Figure 14:
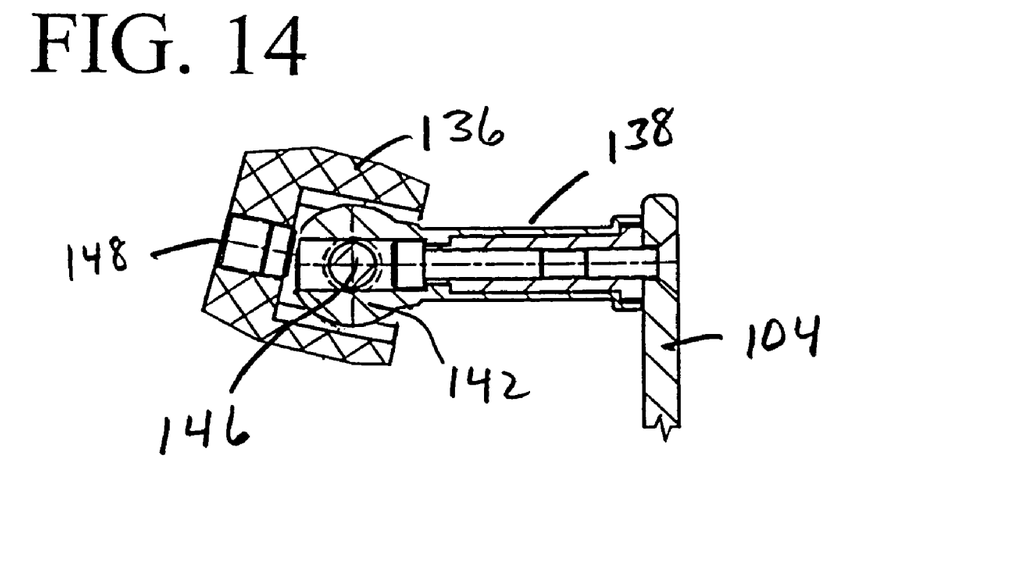
FIG. 14 is a sectional view of the handle of the spinning reel of FIG. 1, with the handle grip unlocked for rotational and pivotal motion.

The pin 134 also permits the handle to pivot with respect to the shank, as shown by comparing the positions of grip 136 in FIGS. 4 and 5, providing an extra degree of freedom of the handle grip, which in turn provides the fisherman with the utmost of comfort and leverage in operating the handle. This feature may be selectively engaged or disengaged, and is shown in FIG. 13 with a set screw 148 locking the handle grip 136 against such pivoting and in FIG. 14 with the set screw 148 disengaged from the ball 142, so that the handle grip 136 is free to pivot as well as rotate. This provides the fisherman with freedom in applying force to the handle arm 30.

What is claimed is:

1. An adjustable-length handle arm for a fishing reel having a shaft extending from a reel body, the handle arm being connected to rotate the shaft, the handle arm comprising:
   A) a receptor arm fixedly mounted to the shaft extending from the reel body;
   B) an extensible arm slidably received in the receptor arm, said extensible arm having a handle grip and defining a plurality of notches;
   C) means releasably securing the extensible arm to the receptor arm, at a selected one of a plurality of positions, said releasable securing means having a releasable stop mechanism having a biased member for selectively securing said extensible arm to said receptor arm;
      wherein the releasable securing means is operable to secure the extensible arm at positions providing a selectable variety of handle arm lengths;
      wherein the releasable securing means is proximate said handle grip so that said releasable securing means may be disengaged by a user's hand that is simultaneously gripping said handle grip;
      wherein said releasable stop mechanism comprises a keeper biased to engage a selected one of said notches of said extensible arm;
      wherein said keeper may be manually disengaged from one of said notches to facilitate relative movement of said extensible arm and said receptor arm;
      wherein said releasable stop mechanism comprises a depressible button biased away from a first side of said receptor arm; and
      said keeper is affixed to a portion of said releasable stop mechanism on a second side of said receptor arm.

2. An adjustable-length arm for a fishing reel comprising:
   A) a receptor arm fixedly rotatably mounted to a shaft extending from a reel body;
   B) an extensible arm slidably affixed to said receptor arm, said extensible arm having a handle grip and defining a plurality of notches;
   C) a releasable stop mechanism operable to secure the extensible arm at a selected position on said receptor arm to provide variety of handle arm lengths;
   D) wherein said releasable stop mechanism is proximate said handle grip so that said releasable stop mechanism may be disengaged by a user's hand that is simultaneously gripping said handle grip;
      wherein said releasable stop mechanism comprises a keeper biased to engage a selected one of said notches of said extensible arm;
      wherein said keeper may be manually disengaged from one of said notches to facilitate relative movement of said extensible arm and said receptor arm;
      wherein said releasable stop mechanism comprises a depressible button biased away from a first side of said receptor arm; and wherein
      said keeper is affixed to a portion of said releasable stop mechanism on a second side of said receptor arm.

* * * * *